United States Patent
Oh

(10) Patent No.: US 6,751,561 B2
(45) Date of Patent: Jun. 15, 2004

(54) POWER SAVING METHOD AND APPARATUS FOR A PORTABLE APPLIANCE

(75) Inventor: Jang Geun Oh, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 09/994,840

(22) Filed: Nov. 28, 2001

(65) Prior Publication Data

US 2002/0065618 A1 May 30, 2002

(30) Foreign Application Priority Data

Nov. 28, 2000 (KR) ........................................ 2000-71284

(51) Int. Cl.⁷ .............................................. G06F 19/00
(52) U.S. Cl. ........................... 702/60; 702/60; 702/183; 702/188; 340/855.8; 340/455; 340/636.1; 307/24; 307/31; 307/126; 700/22; 700/286; 700/293; 320/110; 320/122; 320/104
(58) Field of Search ................................ 702/57, 60–65, 702/183, 188, 189, FOR 103; 340/855.8, 455, 636.1, 636.19, 693.2, FOR 403; 307/24, 31, 126, 140, 46, 48, 66; 700/22, 286, 29, 293, 295, 297; 320/110, 122, 136, 165

(56) References Cited

U.S. PATENT DOCUMENTS

| | | | | |
|---|---|---|---|---|
| 5,196,781 A | * | 3/1993 | Jamieson et al. | 320/61 |
| 5,737,616 A | * | 4/1998 | Watanabe | 395/750.08 |
| 5,930,779 A | * | 7/1999 | Knoblock et al. | 705/412 |

OTHER PUBLICATIONS

Tanaka, "Environmental Firendly Revolution in Home Applicances", Jan. 2000, IPSCS, pp. 91–95.*

* cited by examiner

Primary Examiner—Marc S. Hoff
Assistant Examiner—Elias Desta
(74) Attorney, Agent, or Firm—Fleshner & Kim, LLP

(57) ABSTRACT

Disclosed a system and method of lengthening a life span of a battery power supply in an appliance such as a portable appliance, notebook computer or the like. A power saving method in an appliance includes displaying a user set-up menu for a power saving on a screen by respectively checking systems in the appliance, outputting a control command to a micro-controller in accordance with power saving contents determined on the user set-up menu by a user, and executing a power saving program set up by the user in accordance with the control command of the micro-controller.

22 Claims, 5 Drawing Sheets

FIG. 4

```
┌─ DEVICE POWER OFF CENTER ─────────────────────────── ─ ☒ ┐
│                                                           │
│  POWER-OFF RECOMMENDATION DEVICE      CPU STATE(THROTTLE) │
│      ▨ IEEE1394                       ▭━━━━━━━━━━━━━━     │
│                                       NO            MAX   │
│      ▨ IR                                                 │
│      ▨ USB                                                │
│                                          LCD BRIGHTNESS   │
│      ▨ Audio                               FROM MICOM     │
│      ▨ CD-ROM                         ━━━━━━━━▭━━━━━━     │
│                                       MIN           MAX   │
│      ▨ Modem                                              │
│                                                           │
│  EXECUTE THIS SOFTWARE AT THE FOLLOWING STATUS ?          │
│                                                           │
│    ▨ BATTERY RESIDUE 50%    ▨ BATTERY RESIDUE 20%         │
│    ▨ USER SET-UP[ ]%        ▨ NO                          │
│                                                           │
└───────────────────────────────────────────────────────────┘
```

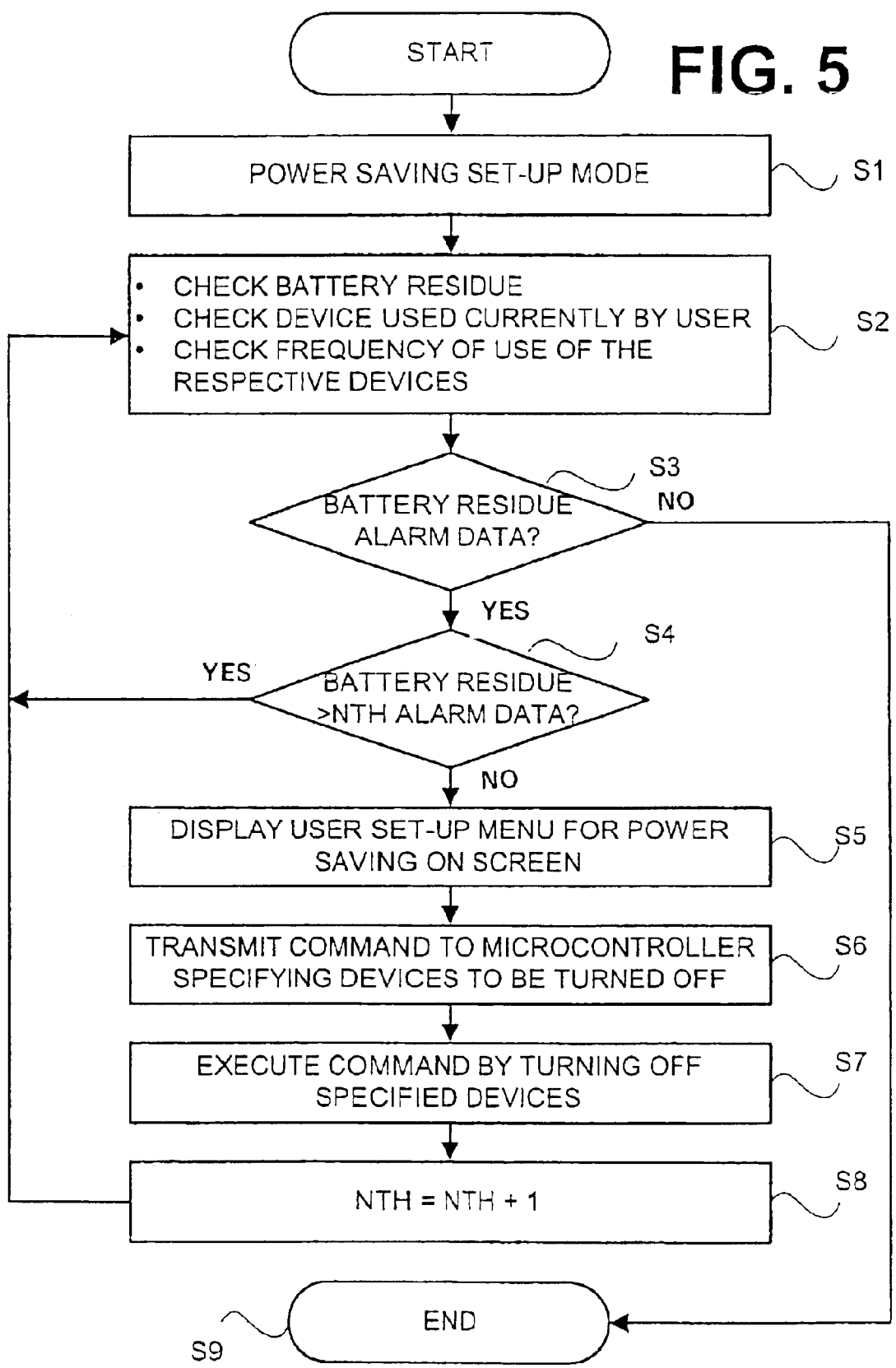

POWER SAVING METHOD AND APPARATUS FOR A PORTABLE APPLIANCE

BACKGROUND OF THE INVENTION

1. Field of the Invention

The present invention relates to an apparatus and method for lengthening a life span of a battery power supply in a portable appliance, and more particularly to improved power management.

2. Background of the Related Art

Many efforts have been made to develop multimedia and personal/notebook computers having various new functions. Such development has generally added new devices, increasing the total power consumption of the system. Many portable systems are optionally powered by batteries. Because power management of the new devices is inadequate in the related art, however, the life span of batteries powering such systems has been significantly reduced.

FIG. 1 illustrates a block diagram of a power supply of a notebook computer according to the related art. In FIG. 1, a power supply of a notebook computer includes a DC (direct current) power supply output unit 11 outputting DC voltage V_DC supplied by either a battery source 15 or an AC source 16 and a AC/DC converter (not shown), a CPU (central processing unit) DC/DC converter 12 supplying a DC voltage required for driving a CPU 12A by converting a DC voltage V_DC outputted from the DC power supply output unit 11; a main DC/DC converter 13 supplying DC voltages required for driving devices 13A to 13N respectively by converting the DC voltage V_DC, and an LCD inverter 14 supplying an LCD driving voltage by converting the DC voltage V_DC.

When being supplied with an AC source 16, the DC power supply output unit 11 converts the AC source voltage into the DC voltage V_DC at a predetermined level and outputs the converted DC voltage V_DC. When the AC source 16 is disconnected, the DC power supply output unit 11 outputs the DC voltage V_DC from the battery 15.

The CPU DC/DC converter 12 (i.e., transformer) converts the DC voltage V_DC outputted from the DC power supply output unit 11 into a DC voltage required for driving the CPU 12A and outputs the converted DC voltage. The main DC/DC converter 13 converts the DC voltage outputted from the DC power supply output unit 11 into DC voltages required for driving the respective devices 13A to 13N installed in or connected to the notebook computer and outputs the converted DC voltages. The LCD inverter 14 generates a voltage required for the LCD by converting the DC voltage V_DC. As shown in FIG. 1, the related art power supply apparatus does not include an additional power supply management apparatus.

FIG. 2 illustrates a data entry table on a window screen according to the related art, where the power supply apparatus fails to have an additional power supply management apparatus for power saving but has a function of warning a user regarding the remaining capacity of a battery supply. As shown in FIG. 2, set up item 21 establishes whether a first alarm is outputted when the remaining capacity of the battery supply reaches a first predetermined level. A warning message of a shortage of the remaining capacity of the battery supply or an alarming sound is outputted on the basis of the set-up item 21 when the remaining capacity reaches the first predetermined level set up by the user. Another set-up item 22 as shown in FIG. 2 establishes whether a second alarm is outputted when the remaining capacity of the battery supply becomes below a second predetermined level. A warning message that a system power supply should be turned off immediately or an alarming sound is outputted on the basis of the set-up item 22 when the remaining battery capacity reaches the second predetermined level set up by the user. The battery alarm is not an effective power supply management technique. Instead, the battery alarm merely informs a user of the remaining capacity of the battery or stores the present status.

ACPI (Advanced Configuration and Power Interface) is an open industry standard for APM (Advanced Power Management) in the related art. With ACPI, power is reduced when a PC (Personal Computer) is not operated. A system supporting ACPI checks activity of peripheral devices through the OS (operating system) to optimize power consumption status for ACPI compatible devices. However, APM fails to meet the user's needs for active power supply management of peripheral devices attached to a PC that are not ACPI compatible. For instance, APM fails to consider compatibility of various communication tools that will be available for PCs in the near future.

Thus, systems in the related art are not sufficiently equipped with power supply management functions that can extend an operation time of a battery supply.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a power saving apparatus in a portable appliance and power saving method thereof by proposing methods to a user for saving a present battery power supply when a remaining capacity of the battery power supply in a portable appliance such as a notebook computer becomes below a predetermined level.

Another object of the present invention is to provide a power saving apparatus in a portable appliance and power saving method thereof that interrupts power supply to less critical or user-sorted devices consuming power in the portable appliance.

Another object of the present invention is to provide a power saving apparatus in a portable appliance and power saving method thereof that reduces a total power consumption of the portable appliance by disconnecting a power supply to certain devices according to a scheme selected or predetermined by a user.

In order to achieve at least the above objects in whole or in part in accordance with the purposes of the invention, as embodied and broadly described herein, there is provided a power saving method in an appliance including inputting power management data into a user set up menu on a display in the appliance, outputting a control command to a microcontroller in accordance with the power management data, and executing the power control command of the microcontroller, wherein the execution includes disconnecting battery power from a selected one of a plurality of appliance devices.

To further achieve at least the above objects in whole or in part and in accordance with the purposes of the invention, as embodied or broadly described, there is provided a power saving method in a portable appliance including checking respective systems in the portable appliance, displaying checked information for at least one of the respective systems in a user set-up menu on a screen when a remaining capacity of a battery is smaller than a first reference value set up previously by a user, outputting a control command to a micro-controller in accordance with power saving data input by a user on the user set-up menu, and executing a power saving program in accordance with the control command of the micro-controller.

To further achieve at least the above objects in whole or in part and in accordance with the purposes of the invention, as embodied and broadly described, there is provided a power saving apparatus in an appliance including a DC power supply output unit that outputs a DC voltage of a predetermined level by converting an AC power supply or by converting a battery voltage, a main DC/DC converter that supplies a plurality of operating voltages to a corresponding plurality of devices by converting the DC voltage, and a plurality of power switches that selectively disconnect each of the plurality of devices selected by a user in order to carry out a power saving function, wherein the plurality of switches are controlled by a micro-controller.

To further achieve at least the above objects in whole or in part and in accordance with the purposes of the invention, as embodied and broadly described, there is provided a power saving method in a portable appliance including a first step of displaying a user set-up menu for a power saving on a screen by checking respective systems in the portable appliance, a second step of outputting a control command to a micro-controller in accordance with power saving contents set up by a user on the user set-up menu, and a third step of executing a power saving program set up by the user in accordance with the control command of the micro-controller.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 illustrates an example of a user set-up menu according to a preferred embodiment of the present invention; and FIG. 5 illustrates a flowchart for a power saving method of a computer according to a preferred embodiment of the present invention.

DETAILED DESCRIPTION OF PREFERRED EMBODIMENTS

Reference will now be made in detail to preferred embodiments according to the present invention, examples of which are illustrated in the accompanying drawings.

Figure 1:
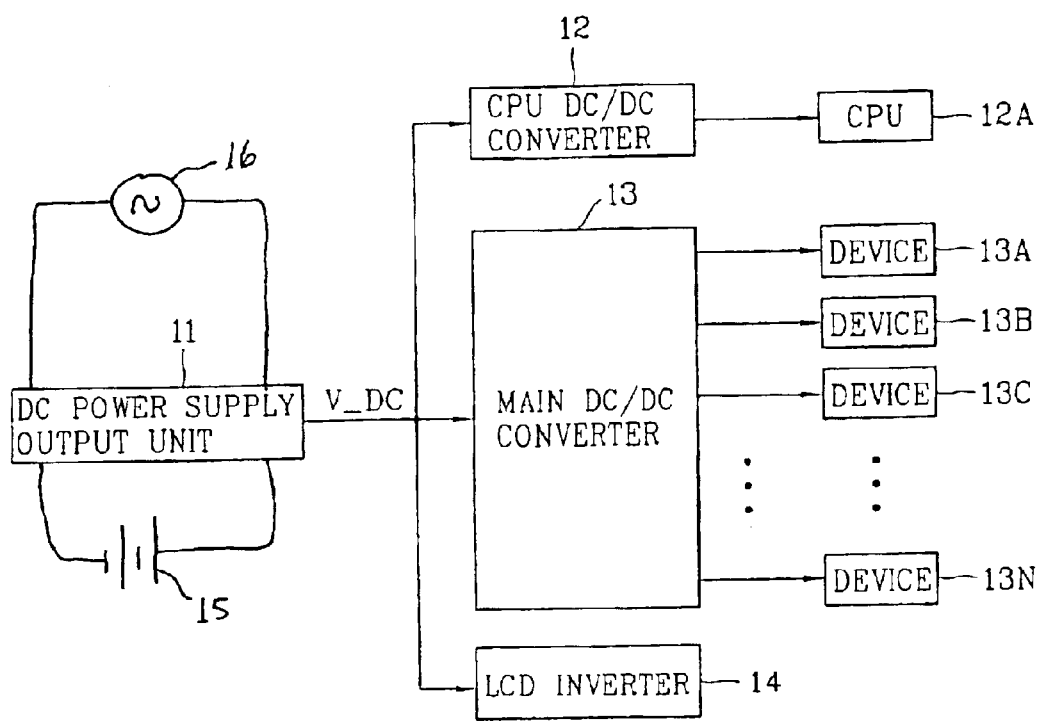
FIG. 1 illustrates a block diagram of a power supply of a notebook computer according to the related art.
Figure 2:
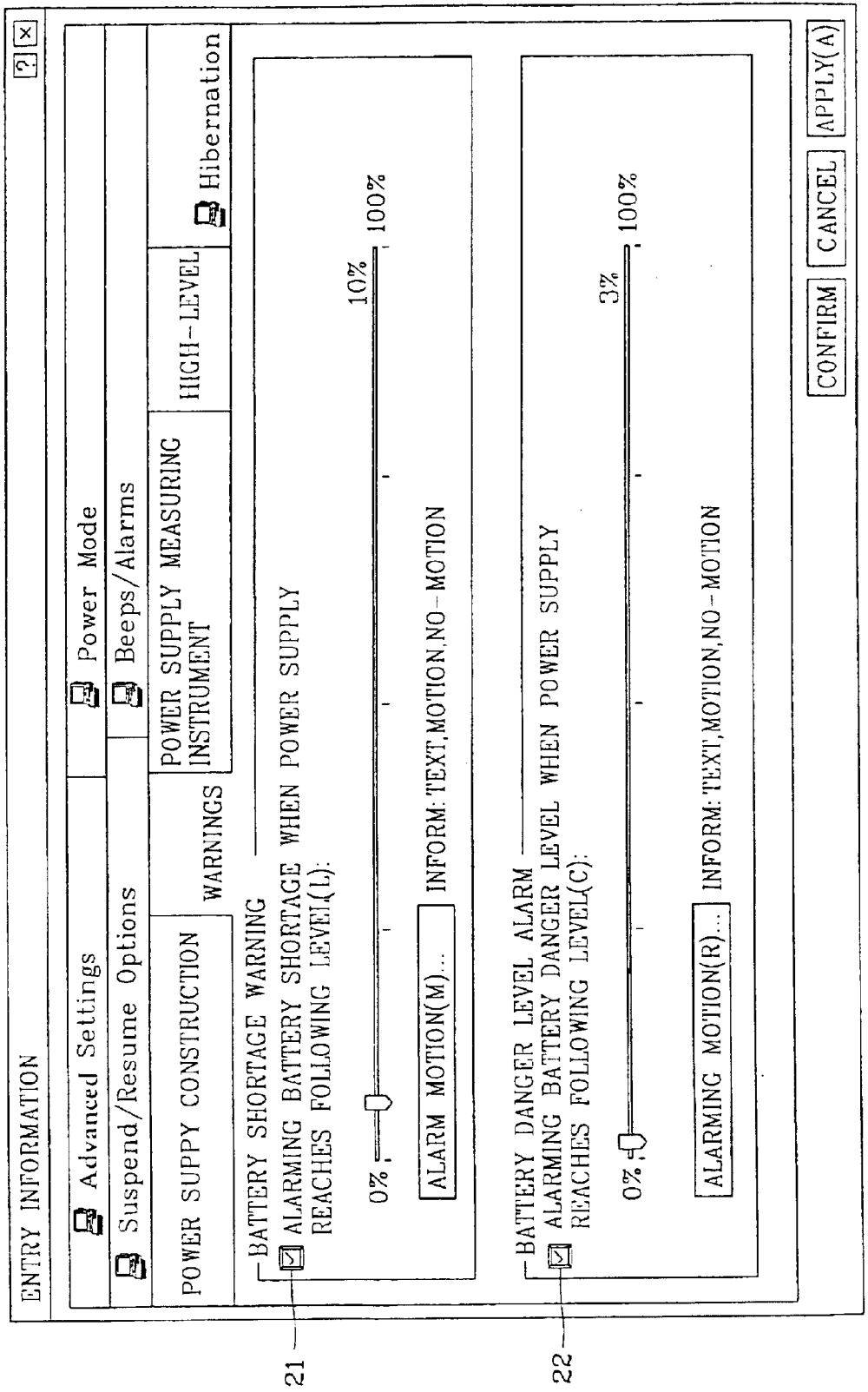
FIG. 2 illustrates a power supply management window screen according to the related art.
Figure 3:
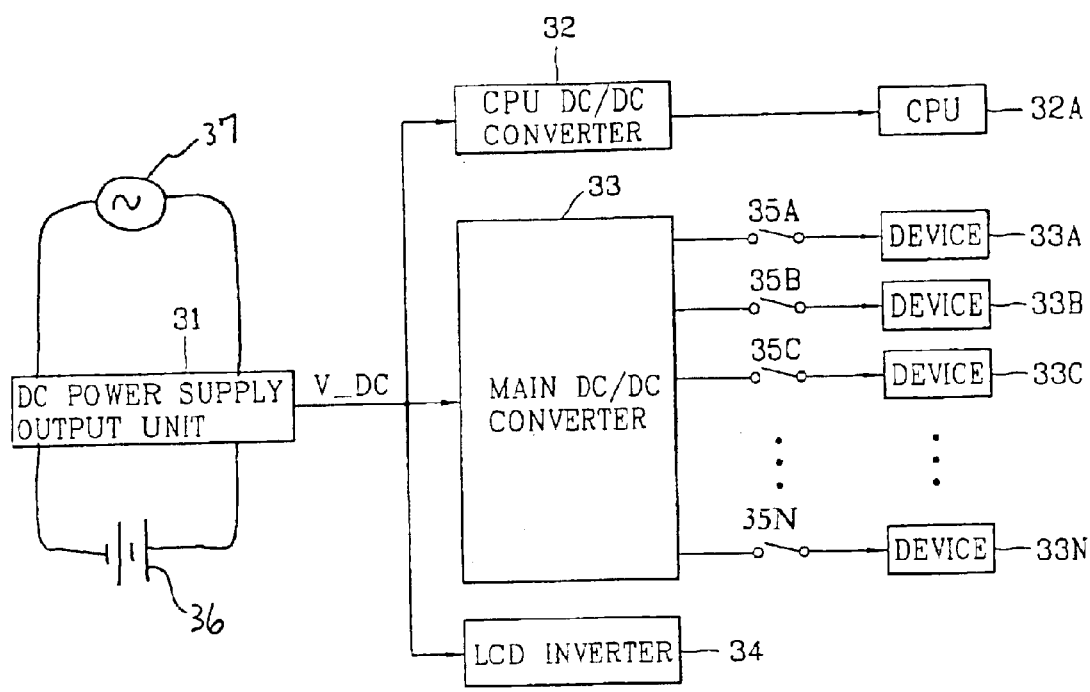
FIG. 3 illustrates a block diagram of a power supply apparatus in a computer according to a preferred embodiment of the present invention.

FIG. 3 illustrates a block diagram of a preferred embodiment of a power supply apparatus in a notebook computer to which a power saving method according to the present invention can be applied. The power supply apparatus may include a DC power supply output unit 31 outputting a battery voltage or a DC voltage of a predetermined level converted from an AC power supply 37, a CPU DC/DC converter 32 supplying a DC voltage required for a CPU 32A by converting the DC voltage V_DC outputted from the DC power supply output unit 31, and a main DC/DC converter 33 supplying DC voltages required for driving devices 33A to 33N respectively by converting the DC voltage V_DC. An LCD inverter 34 can supply an LCD with a driving voltage by converting the DC voltage V_DC, and power switches 35A to 35N preferably turn on/off powers of the respective devices 33A and 33N to carry out a power saving function under control of a micro-controller or the like.

The power supply apparatus may further include a clock generator (not shown in FIG. 3) supplying the CPU 32A with a clock. The clock generator may adjust the clock applied to the CPU 32A by a selection of the user. Through this adjustment, a clock-throttling rate of the CPU 32A, which will be described later, may be varied.

In a first mode of operation, an appliance such as a notebook computer shown in FIG. 3 may supply the respective devices 33A to 33N with a power supply by utilizing AC power supply 37. In the first mode, the DC power supply output unit 31 may convert the normal AC power supply 37 voltage into a DC voltage of a predetermined level and may output the converted DC voltage. The DC/DC converter 32 may convert the DC voltage V_DC, which is outputted from the DC power supply output part 31, into a DC voltage having a level required for the CPU 32A and may output the converted DC voltage. The main DC/DC converter 33 may convert the DC voltage V_DC into DC voltages required for driving the respective devices 33A to 33N installed in or connected to the notebook computer and may output the converted DC voltages. The LCD inverter 34 may generate a voltage required for the LCD by converting the DC voltage V_DC.

FIG. 3 also illustrates a power saving features for a second mode of operation of the appliance that uses battery 36. A battery power supply mode may exist when the external AC power supply applied to the DC power supply output unit 31 is disconnected. On/off switches 35A to 35N are coupled to power supply terminals of devices 33A to 33N, respectively so that the power for driving the respective devices may be selectively turned on or off. Each of the on/off switches 35A to 35N may be a transistor, thyristor, IGBT (insulated gate bipolar transistor), GTO (gate turn-off) thyristor, other electronic switch or the like. Moreover, the on/off switches 35A to 35N may be controlled by a MICOM (microcomputer) (not shown in FIG. 3) that may be built into the appliance such as the notebook computer and controlled via software. For example, a command of the user may be transferred to the MICOM through an application device driver in the Windows environment. However, the present invention is not intended to be so limited to a microcomputer.

FIG. 4 illustrates an example of a user set-up menu according to preferred embodiments of the present invention, in which various selectable options may be provided enabling a user to perform a power supply management task related to battery operation. When the battery power supply mode is activated, an application program for Windows in a portable appliance preferably may measure the remaining capacity of battery 36 and may determine the frequency that devices 33A to 33N are being used. In this case, the frequency of use means how many times the respective devices are used while the user uses the portable appliance.

There are alternative methods for measuring the frequency of use. In one embodiment, the system may record the number of times that each device 33A to 33N is used from the moment that the user turns on the power of the portable appliance to the moment that the user turns off the power. In another embodiment, the system may record the number of minutes that each device 33A to 33N is used from the moment that the user turns on the power of the portable appliance to the moment that the user turns off the power. Other methods for determining frequency for use may also be used. The system may display composite frequency of use information to a user. A user may use this information, for example, to identify un-used or less-used devices that do not require power at selected battery capacity levels or modes of operation.

When it is determined that the remaining capacity of battery 36 reaches a predetermined limit (for example 50%), the application program for Windows may display a user set-up menu for power saving in the form of pop-up window shown in FIG. 4. A user may also be able to access the user set-up menu shown in FIG. 4 upon demand or periodically.

A "power-off recommendation" (e.g., device) may be presented to a user on the basis of frequency of use calculations. This means that a user may save power by turning off the power of the recommended device without causing any inconvenience or limited inconvenience in using the system. In one embodiment, a user may also select a CPU state (i.e. a clock throttle rate) and an LCD brightness level, in accordance with the remaining capacity of battery 36.

FIG. 5 illustrates a flowchart showing a preferred embodiment of a power saving method according to the present invention. In this example, a system may be driven using internal battery 36 when external power supply 37 is disconnected.

In a mode where external power is disconnected, an application program for Windows may proceed to display a user set-up menu for power saving in the form of a pop-up window, for example as shown in FIG. 4, in step S1. In one embodiment, a user may select among "power-off recommendations" (e.g., of devices) presented to a user on the basis of frequency of use. A user may also select a CPU state (i.e. a clock throttle rate) and an LCD brightness level and an execution time or status (e.g., percentage of remaining battery capacity or none). The power-off recommendations can be selected by the user to disable connected devices (e.g., IEEE1394, IR, USB, Audio, CD-ROM, Modem or the like) to reduce a power consumption rate. The frequency of use is preferably an indication presented to the user indicating relative importance and can include how many times or how much time the respective devices are used since appliance turn-on, internal battery power selected, or a composite indication of such information. As shown in FIG. 4, the respective devices have been preferably displayed in a ranked order. In step S1, the user set-up menu for power saving can preferably be determined for execution for one, more than one (e.g., 50%, 20% or x % battery residue) or no battery capacity levels. In FIG. 5, step S1 can be performed on (user) demand, periodically or optionally. However, if step S1 is not performed, a system default level may be preset (e.g., 50%) for an Nth alarm data.

The application program for Windows may then determine in step S2, through a well-known battery capacity detector (not shown in FIG. 3), a present remaining capacity of battery 36 and the frequency of use for devices 33A to 33N. The application program for Windows may then determine in step S3 whether battery residue alarm (control) data exists. If no battery residue alarm data exists, the process may terminate in step S9. Otherwise, control may continue to step S4.

The application program for Windows may then determine in step S4 whether the battery residue or remaining capacity of the battery power supply is greater than an Nth limit or Nth alarm data, e.g. 50%, previously set by the user.

Where the remaining capacity of the battery power supply is larger than the user previously set-up Nth alarm data (e.g., first limit), the application program for Windows may return to step S2. Where the remaining capacity of the battery power supply is less than the user defined first limit, the application program for Windows may proceed to step S5 to display a user set-up menu for power saving such as shown in FIG. 4. Based on information from step S2, the system may recommend device(s) for power disconnect, enabling a user to achieve power savings with little or no inconvenience to the user.

In step S5, the application program for Windows may also display a corresponding menu so that the user can set the state of CPU 32A, that is, a clock throttling rate (which represents a relative numeral value of processing speed) of CPU 32A and a brightness level of the LCD. Where a user wishes to minimize power consumption, the user may select all recommended devices for power disconnect, and may further adjust the clock throttling rate of CPU 32A and the brightness of the LCD to minimum levels.

If the user selects the recommended device(s), a list of selected devices may be transmitted (e.g., to a micro-controller (not shown)) as a code in step S6. The micro-controller may receive the code corresponding to the devices and may then output a disable signal (e.g., a switch-off signal) to the respective switches (e.g., 35A to 35N in FIG. 3), thereby turning off the corresponding device(s) in step S7.

Where a user has selected changes to the CPU state and/or LCD brightness, a control command may be transmitted to the micro-controller in step S6 in order to control the clock throttling rate of CPU 32A, the brightness of the LCD, and other power saving contents. Thus, the settings of step S6 may be executed in step S7.

The application program for Windows may then determine in step S8 an incremented value for N, which is preferably used to determine whether additional battery residue alarm (control) data exists in step S3, and the process may again return to step S2 to monitor battery capacity and frequency of device use.

In one embodiment, a user may predetermine two alarm (control) data limits being a first limit at 50% and a second limit, e.g. 20%, for power management. In this case, the process may sequentially determine in step S4 whether the remaining battery capacity has dropped below the first and then second limit. If it has, a user may select power management functions in step S5 for execution in step S7 before the process ends.

As described above, preferred embodiments according to the present invention provide methods for conserving battery power where the remaining capacity of the battery power supply in a portable appliance such as a notebook computer is reduced below one or more prescribed levels or values. Preferably, a user is guided to select less-used devices to reduce power consumption at prescribed levels.

Accordingly, preferred embodiments according to the present invention enable a user to increase or maximize battery life, while reducing or minimizing functional inconvenience.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power saving method in an appliance, comprising:
   inputting power management data into a user set up menu on a display associated with the appliance;
   outputting a control command to a micro-controller in accordance with the power management data; and
   executing the power control command of the micro-controller, wherein the execution includes disconnecting battery power from a selected one of a plurality of devices in the appliance, wherein the inputting power management data comprises,
   measuring remaining capacity of a battery and frequency of use of the devices in the appliance, and
   selecting devices on the user set-up menu to be disconnected from the battery power.

2. The power saving method of claim 1, wherein the inputting power management data comprises displaying the user set-up menu when the remaining capacity of the battery is smaller than a prescribed limit.

3. The power saving method of claim 2, wherein the user set-up menu comprises an item for selecting at least one device to be disconnected from the battery power.

4. The power saving method of claim 2, wherein the power management data includes user selected specific devices to be disabled when remaining battery capacity is less than a prescribed limit.

5. A power saving method in a portable appliance, comprising:
   checking respective devices in the portable appliance;
   displaying checked information for at least one of the respective devices in a user selectable menu on a screen when a remaining capacity of a battery is smaller than a first reference value set up previously by a user;
   outputting a control command to a micro-controller in accordance with power saving data input by a user on the user selectable menu; and
   executing a power saving program in accordance with the control command of the micro-controller.

6. The power saving method of claim 5, wherein the checking the respective devices in the portable appliance comprises checking the remaining capacity of the battery, a status of respective devices installed in the portable appliance, and a frequency of use of the respective devices.

7. The power saving method of claim 6, wherein the frequency of use of the respective devices is measured by the number of times the respective devices are used.

8. The power saving method of claim 7, wherein the frequency of use of the respective devices is measured from a moment that a power of the portable appliance becomes turned on.

9. The power saving method of claim 7, wherein the frequency of use of the respective devices is determined by accumulating measured values for each use of the portable appliance.

10. The power saving method of claim 5, wherein the user selectable menu comprises an item for selecting at least one device to be disconnected from the battery power.

11. The power saving method of claim 5, wherein the user selectable menu comprises an item for establishing a clock throttling rate of a CPU or a brightness of a LCD in the portable appliance.

12. The power saving method of claim 5, wherein the user selectable menu comprises:
   an item for selecting a respective device installed in the portable appliance for which power will be turned off;
   an item for selecting a dock throttling rate of CPU and a brightness of LCD; and an item for selecting a predetermined battery level, below which the power saving program is executed.

13. The power saving method of claim 5, wherein the user selectable menu is a user set-up menu that is displayed as a pop-up window.

14. The power saving method of claim 5, comprising:
   re-checking respective devices in the portable appliance; and
   re-displaying the user selectable menu on the screen when the remaining capacity of the battery is smaller than a second lower reference value set up previously by the user.

15. A power saving apparatus, comprising:
   means for checking respective devices in a portable appliance;
   means for displaying checked information for at least one of the respective devices in a user set-up menu on a screen when a remaining capacity of a battery is smaller than a first reference value;
   means for outputting a control command to a micro-controller in accordance with power saving data input by a user on the user set-up menu; and
   means for executing a power saving program in accordance with the control command of the micro-controller.

16. The power saving apparatus of claim 15, wherein the checking means checks the remaining capacity of the battery, a status of respective devices installed in the portable appliance, and a frequency of use of the respective devices.

17. The power saving apparatus of claim 16, wherein the frequency of use of the respective devices is measured at least one of by the number of times the respective devices are used, from a moment that a power of the portable appliance becomes turned on, and by accumulating measured values for each use of the portable appliance.

18. The power saving apparatus of claim 17, wherein the user set-up menu comprises:
   ranked items for selecting a respective device installed in the portable appliance for which power will be turned off;
   an item for selecting a clock throttling rate of CPU and a brightness of LCD; and
   an item for selecting a predetermined battery level, below which the power saving program is executed.

19. The power saving apparatus of claim 15, wherein the checking means re-checks respective devices in the portable appliance, and wherein the displaying means re-displays the user set-up menu on the screen when the remaining capacity of the battery is smaller than a second lower reference value set up previously by the user.

20. A power saving method in a portable appliance, comprising:
   checking respective devices in the portable appliance;
   presenting a power-off recommendation list of the devices based on the checking result; and
   selecting at least one of the power-off recommendation list of the devices.

21. The power saving method of claim 20, wherein the checking the respective devices in the portable appliance comprises checking a frequency of use of the respective devices installed in the portable appliance, and a remaining capacity of battery.

22. The power saving method of claim 20, wherein the selecting at least one of the power-off recommendation list of the devices comprises selecting a CPU state and LCD brightness level.

* * * * *